Aug. 9, 1949.                J. GRAVES                 2,478,477
                      WHEEL BALANCING APPARATUS
                        Filed Dec. 22, 1945
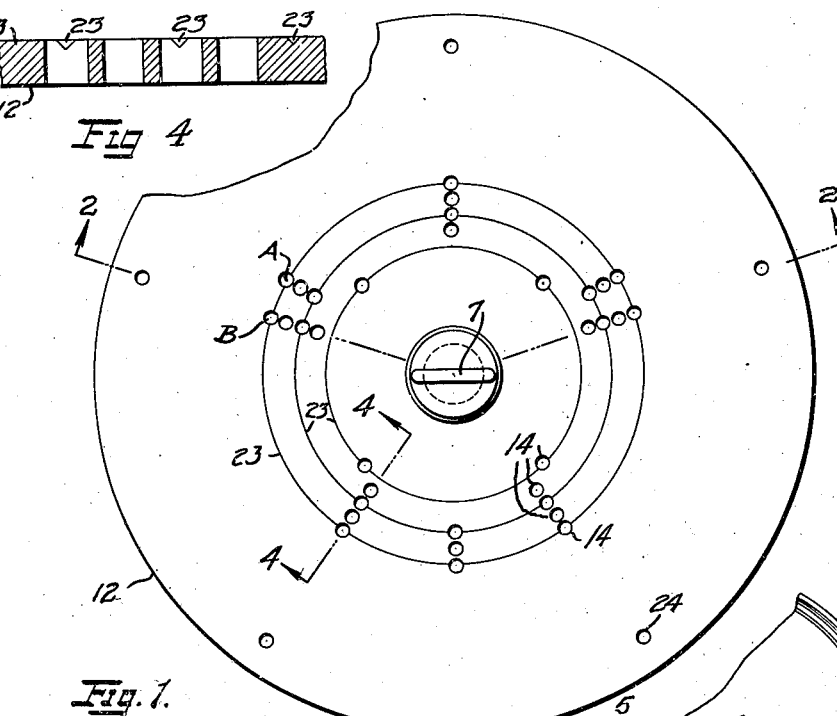
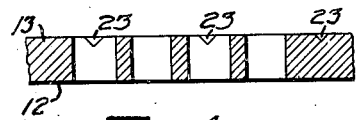
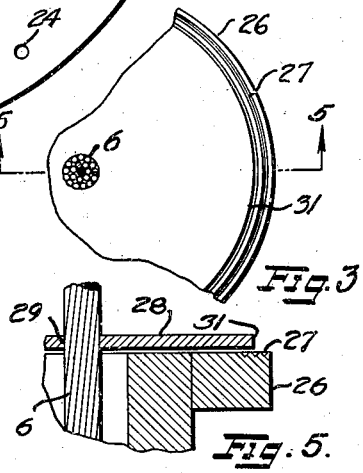
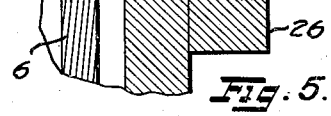
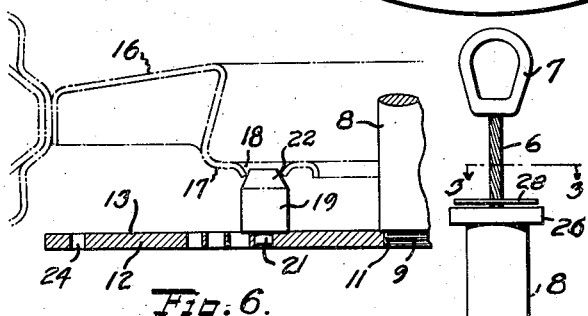
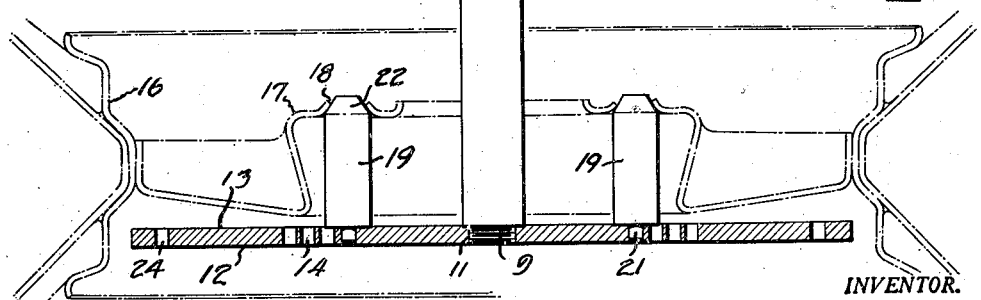
INVENTOR.
JAY GRAVES
BY Gardner & Warren
his atty.

Patented Aug. 9, 1949

2,478,477

UNITED STATES PATENT OFFICE 2,478,477

WHEEL BALANCING APPARATUS

Jay Graves, Berkeley, Calif., assignor to Speedmaster, Limited, Oakland, Calif., a copartnership composed of Jay Graves and Arthur N. Butler Application December 22, 1945, Serial No. 636,843

1 Claim. (Cl. 73—66)

1

This invention relates to balancers of the pendant type which are employed to indicate conditions of unbalance in members such as vehicle wheels or wheel and tire assemblies.

An object of the invention is to provide, in a balancer of the character described, means for centering wheels relative to the axis of the balancer without the necessity of removing the wheel hub from the vehicle axle as is usually necessary in assuring proper operation of presently available types of balancers.

Another object of the invention is to provide wheel centering means for balancers which permits the operation of mounting the wheel on the balancer to be accomplished in but a fraction of the time heretofore required in other balancing apparatus.

A further object of the invention is to provide, in a balancer of the character described, adjustable wheel engaging elements which may be rapidly shifted to accurately center a wide variety of wheel sizes and designs.

Still another object of the invention is to provide, in a pendant type wheel balancer, an improved balance indicator by means of which more minute conditions of unbalance are rendered apparent to the observer.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawing:

Figure 1 is a top plan view of a pendant balancer including the improvement of my invention.

Figure 2 is a view, partly in front elevation and partly in vertical section, of the structure shown in Figure 1. The plane of section is indicated by the line 2—2 of Figure 1.

Figure 3 is an enlarged fragmental plan view of the indicator. The plane in which the view is taken is indicated by the line 3—3 of Figure 2.

Figure 4 is an enlarged fragmental sectional view of the disk. The plane in which the view is taken is indicated by the line 4—4 of Figure 1.

Figure 5 is a vertical sectional view of the structure shown in Figure 3; the plane of section being indicated by the line 5—5 of Figure 3.

Figure 6 is a fragmentary view similar to Figure 2 but showing the structure designed for a modified form of application.

Among the more successful and commercially preferred types of wheel balancers are those of the pendant type in which the wheel to be balanced is mounted concentrically on an axially vertical tubular carrier or mandrel attached at a point on the axis of the carrier which is positioned at or slightly above the center of gravity of the wheel, to a cable or other such member depending from an overhead support. Since the suspension cable is arranged to coincide with the axis of the carrier, any degree of unbalance in the wheel will be indicated by the extreme upper end of the carrier assuming a position of eccentricity with relation to the suspension cable and corrective measures, such as the addition to the wheel of counterweights diametrically opposed to the unbalancing areas, may be undertaken to bring the cable and carrier into exact concentricity wherein a comparatively perfect state of balance will exist. In the aforesaid types of balancers, it has been the accepted practice to process the wheels with their hubs attached. This of course means that considerable time is consumed, in addition to that required for the actual balance testing and correction, for removal and replacement of the hubs. The removal of the hubs also entails the withdrawal of the wheel bearings and the cleaning, prior to testing, of the excess packing grease from the hub. In replacing the hub, repacking of the latter with grease and adjustment of the bearings are necessary. All of these operations are due to the fact that, in the balancers with which I am familiar, the only way in which the balancer may be centralized with the wheel is by engagement of grip members, carried by the balancer, in the axial bore of the wheel hub. Also, in the types of balancers above described, the balance indicator which usually consists of a relatively stationary disk carried by the cable and axially registrable with the upper end of the tubular carrier when optimum balance obtains, may not convey an accurate indication to the observer since slight degrees of eccentricity are hard to discern and inadequate lighting or intervening objects which cast shadows on the indicator edge may enhance the likelihood of inaccurate readings. It is hardly necessary to point out that even a slight condition of unbalance remaining in a wheel which may later be rotated at comparatively high speed can cause a highly annoying rythmic vibration in a vehicle or may cause difficulties or dangerous hindrances in steering.

The improved balancer elements of my invention which are set forth in the following description overcome the aforesaid objectionable features inherent in previously proposed pendant type balancers.

In Figure 2 I have illustrated a pendant balancer, embodying the improvements of my invention, in which the comparatively fixed member or cable 6 is fitted at its upper end with an eye 7, or other suitable attachment, by means of which the balancer may be secured to depend from an overhead supporting structure. The latter structure is not shown in the drawing since it forms no part of the present invention. A tubular carrier 8 is provided axially concentric with the cable 6 and into which the latter extends. At a point adjacent the lower end of the carrier 8, the lower end of the cable is attached thereto so that the carrier is not only supported by the cable but is free to tilt to a limited degree in any direction radially of the axis of the cable. The particular means for attaching the cable to the carrier forms no part of the present invention and hence is not shown. However, it is important and should be understood that the uppermost point of permanent intimate contact between the cable and carrier must be located at or slightly above the center of gravity of any object which is to be tested by the balancer. The lower end of the carrier is provided with attachment means, preferably comprising a threaded stud 9 coaxial with the carrier and receivable in a complementarily threaded aperture 11 which is provided at the center of a carrier disk 12 whose upper surface 13 normally intersects the axis of the carrier 8 and, when in perfect balance, also similarly intersects the axis of the cable 6. The carrier disk should be made of thoroughly annealed stock so as to eliminate all locked in fiber stresses which later, under temperature changes or for other reasons, may be relieved to cause possible warpage of the carrier disk and thereby impair the accuracy of the balancer.

Means is provided for supporting an object to be balanced on the carrier disk and for centralizing the object with respect to the vertical axis of the present cable. Provided in the disk 12 are concentric groups of circumferentially spaced apertures 14 each group being concentric with the center of the disk. Each group of holes may be related to a particular object to be balanced and are arranged for connection with complementary permanent mating elements on the object so that the latter or a duplicate thereof may be repeatedly detached from and re-attached to the balancer with the respective axes of the latter and the object to be tested in perfect coincidence. I have chosen, however, to illustrate the utility of the balancer in connection with demountable vehicle wheels, one type of which is shown by the dotted lines 16 in Figure 2. These wheels may be of the type provided with a web 17 in which is provided a group of apertures 18 concentric with the wheel center and circumferentially arranged thereabout which receive mounting studs carried by the wheel hub and are countersunk to receive correspondingly tapered nuts engaging the studs for securing the wheel to the hub. I provide a plurality of stud elements 19 each of which is provided with a coaxial peg 21 adapted to snugly fit into an aperture 14 of the carrier disk 12 and with an end element engageable with the object to be supported on the balancer. In this case, the upper end of each stud element is machined to form a conically-shaped plug 22 which may enter the apertures 18 of the wheel either from the countersunk end as shown in Figure 2, or from the reverse end thereof as shown in Figure 6. The stud elements 19 are of sufficient length as to support the wheel entirely clear of the carrier disk and to locate the aforesaid pivotal connection of the cable with the carrier 8 at or above the center of gravity of the wheel.

Among the many makes of vehicles on the market, there are numerous arrangements and spacings of the wheel mounting holes and in order to accommodate the balancer to all wheel types it is necessary that the stud elements 19 be capable of rearrangement to match the placement of the holes of the particular wheel which it is desired to balance. In Figure 1, I have shown the carrier disk provided with a plurality of holes arranged to form patterns to which the stud elements 19 may be fitted so as to accommodate almost any wheel which is encountered and I also provide means comprising scribed lines 23 which traverse all holes in a group which are the same radial distance from the center of the disk so that ready selection of the proper holes to use, for a given stud element arrangement, may be made. As illustrated, it is necessary to provide only alternate circumferential groups of holes with lines 23 since the relationship of a hole to a particular group may be quickly recognized by referring to the nearest line in the event that the line does not actually traverse the hole in question. The innermost circle is laid out to a diameter which corresponds to the wheel bolt circle of a certain make of automobile and, for example, is provided with four equally spaced holes which is the wheel bolt arrangement of said automobile. The next larger circle corresponds with the bolt circle used on another automobile but in this case a total of five mounting bolts are employed so that a total of five equally spaced holes are provided in the group. The next larger circle may accommodate two separate models or makes of vehicle which possess the same diameter of bolt circle but which have a different bolt pattern. For instance, one vehicle may have six bolts in its wheel in which case the three holes which are 120 degrees apart and are marked "A" are used to position the stud elements 19. Another vehicle wheel may have five bolts in which case the holes marked "B" in the same circle are used. Other patterns and bolt circles may be arranged similarly including the extraordinary pattern found in one model of vehicle and illustrated by the outermost holes 24.

In operation, the device as illustrated is detached from its support, by releasing the eye 7 from its holding element, and is set down with the carrier disk 12 resting on the floor or other supporting surface. The wheel 16 to be tested is then removed from the vehicle and the holding bolt circle is measured and the number of bolts noted. The corresponding circle is then found in the carrier disk and the stud elements 19 are arranged in the proper holes to accommodate the wheel bolt holes. In case the wheel has four or five bolt holes, the same number of stud elements must be employed in the disk. However, if the wheel has six bolts, only three stud elements need be used to provide a proper support and centering for the wheel. The wheel is then placed over the balancer with the normally outer surface of the former preferably upward and with the carrier tube 8 projecting upwardly through the center aperture of the wheel. The wheel is then manipulated to seat the stud elements 19 in the appropriate bolt holes 18 whereupon the balancer is lifted and the eye 7 is reattached to its overhead support so as to freely suspend the balancer. The actual balancing of the wheel may then proceed.

I provide the upper end of the carrier tube 8 with a collar 26 which may be pressed or sweated into engagement with the tube and which is provided in its upper surface and adjacent the perimeter of the latter with a plurality, preferably three, of concentrically scribed grooves 27. The circular indicator disk 28, which has a central aperture 29 through which the cable 6 tightly passes, is fixed to move with the cable and has its perimeter 31 vertically registered with the center groove 27 of the group thereof. To enhance visibility of the indicator grooves the latter may be filled or coated with a white or other light-reflecting substance and the upper surfaces of the collar 26 and disk 28 may be oxidized to a black finish for contrast. If desired, the lines 23 and the surface 13 of the carrier disk 12 may be similarly treated. An unbalanced wheel will obviously tilt from a horizontal plane toward the heavier portion of the wheel and will consequently cause the carrier tube 8 to tilt relative to the constantly vertical support cable 6. This will cause the disk 28 to assume an eccentric position relative to the collar depending on the amount of overbalance. Counterweights are then applied to the wheel in a radial line intersecting the point of closest approach of the perimeter 31 of the disk to the perimeter of the collar 26. This counter-weighting when applied at successively indicated points will eventually bring the disk 28 into substantial concentricity with the center groove 27 which will indicate the optimum of balance which has been achieved. The provision of three reference circles on the collar 26 provides more readily evident eccentricity between the grooves and the indicator disk and also serves to more clearly evaluate the difference in registry than does the operation of registering the disk with the perimeter of the carrier tube as has been done heretofore in balancers of this character.

From the foregoing description of the invention it will be apparent that I have provided means for more rapidly testing individual objects such as vehicle wheels for proper balance, that a wide variety of objects may be accommodated in the apparatus, that rapid adjustment to condition the device for various objects may be easily accomplished, and that a finer visual indication of the degree of balance obtaining may be had.

I claim:

In apparatus of the pendant type for effecting statical balance in a vehicle wheel having about the rotational center thereof a plurality of radially-equidistant circumferentially-spaced mounting holes, support means for said wheel including a pendant member and a tubular carrier member attached to, axially concentric with said pendant member and tiltable relative to the latter in response and in proportion to a degree of unbalance in said wheel, a carrier disk attached to the lower end of said tubular carrier member and concentric therewith, said carrier disk having groups of apertures arranged in symmetrical patterns relative to the center of said disk, said patterns including the pattern arrangement of said wheel mounting holes, concentric lines on said disk intersecting related holes of said groups thereof, stud members engageable in selected holes of a pattern and rising from said carrier disk, said stud members being engageable in the mounting holes of said wheel, when the latter is superposed on said carrier disk, to center said wheel with the common axis of said pendant member and the tubular carrier member, a collar on said carrier member, said collar having a plurality of concentric circular graduations adjacent its periphery, and a circular indicator carried by said pendant member and having a diametrical dimension coinciding with the diameter of an intermediate circular graduation.

JAY GRAVES.

REFERENCES CITED

The following references are of record in the file of this patent:

UNITED STATES PATENTS

| Number | Name | Date |
|---|---|---|
| D. 141,990 | Butler | Aug. 7, 1945 |
| 1,977,297 | Weaver | Oct. 16, 1934 |
| 2,172,006 | Buckner et al. | Sept. 6, 1939 |
| 2,176,269 | Morse | Oct. 17, 1939 |
| 2,178,101 | Hatch | Oct. 31, 1939 |